United States Patent
Giroudiere et al.

(10) Patent No.: US 8,894,967 B2
(45) Date of Patent: Nov. 25, 2014

(54) PROCESS FOR THE PRODUCTION OF HIGHLY THERMALLY-INTEGRATED HYDROGEN BY REFORMING A HYDROCARBON FEEDSTOCK

(75) Inventors: Fabrice Giroudiere, Orlienas (FR); Christophe Boyer, Charly (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 1692 days.

(21) Appl. No.: 12/057,591

(22) Filed: Mar. 28, 2008

(65) Prior Publication Data

US 2009/0241418 A1     Oct. 1, 2009

(51) Int. Cl.
| | |
|---|---|
| *C01B 3/02* | (2006.01) |
| *C01B 3/22* | (2006.01) |
| *C01B 3/24* | (2006.01) |
| *C01B 3/48* | (2006.01) |
| *C01B 3/56* | (2006.01) |
| *C01B 3/32* | (2006.01) |
| *C01B 3/38* | (2006.01) |

(52) U.S. Cl.
CPC ......... *C01B 3/323* (2013.01); *C01B 2203/0283* (2013.01); *C01B 2203/0833* (2013.01); *C01B 3/48* (2013.01); *C01B 2203/0883* (2013.01); *C01B 2203/0894* (2013.01); *C01B 2203/042* (2013.01); *C01B 2203/0244* (2013.01); *C01B 2203/025* (2013.01); *C01B 2203/80* (2013.01); *C01B 2203/0811* (2013.01); *C01B 2203/0877* (2013.01); *C01B 2203/1229* (2013.01); *C01B 2203/0866* (2013.01); *C01B 2203/0888* (2013.01); *C01B 3/56* (2013.01); *C01B 2203/148* (2013.01); *C01B 2203/1294* (2013.01); *C01B 2203/1614* (2013.01); *C01B 2203/047* (2013.01); *C01B 2203/1288* (2013.01); *C01B 2203/1235* (2013.01); *C01B 2203/127* (2013.01); *C01B 2203/0205* (2013.01); *C01B 3/382* (2013.01); *C01B 2203/066* (2013.01); *C01B 2203/0405* (2013.01); *C01B 2203/146* (2013.01)
USPC ......................... 423/650; 423/644; 423/648.1

(58) Field of Classification Search
USPC ................ 422/198, 200, 201, 600; 48/127.9, 48/197 R, 197 FM, 198.1, 199 FM; 423/212, 246, 248, 650, 652
See application file for complete search history.

(56) References Cited

U.S. PATENT DOCUMENTS

| | | | | |
|---|---|---|---|---|
| 4,137,041 | A * | 1/1979 | Woodroff et al. | 432/222 |
| 2002/0090327 | A1* | 7/2002 | Deshpande | 422/190 |
| 2004/0101720 | A1* | 5/2004 | Ogawa | 429/20 |
| 2005/0244329 | A1* | 11/2005 | Casanave et al. | 423/651 |

OTHER PUBLICATIONS

Kolios et al., "Heat-Integrated Reactor Concepts for Hydrogen Production by Methane Steam Reforming," 2005, Fuel Cells, 5, No. 1, pp. 52-65.*

* cited by examiner

*Primary Examiner* — Melvin C Mayes
*Assistant Examiner* — Colin W Slifka
(74) *Attorney, Agent, or Firm* — Millen, White, Zelano & Branigan, P.C.

(57) ABSTRACT

A process for the production of highly thermally-integrated hydrogen by reforming a hydrocarbon feedstock wherein a stream of air or water, whose temperature is less by at least 200° C. than the combustion temperature inside a burner, is mixed with the effluent that is obtained from said burner, so as to reduce the temperature of this effluent to less than 725° C.; the mixture obtained is used to superheat at least one stream of water vapor and/or hydrocarbon feedstock in gaseous form, whereby said stream that is thus superheated by indirect heat exchange is injected directly into a reforming reactor where it is used as a fuel; and the second heat exchanger and is used to totally evaporate a stream of liquid water and/or hydrocarbon feedstock.

15 Claims, 1 Drawing Sheet

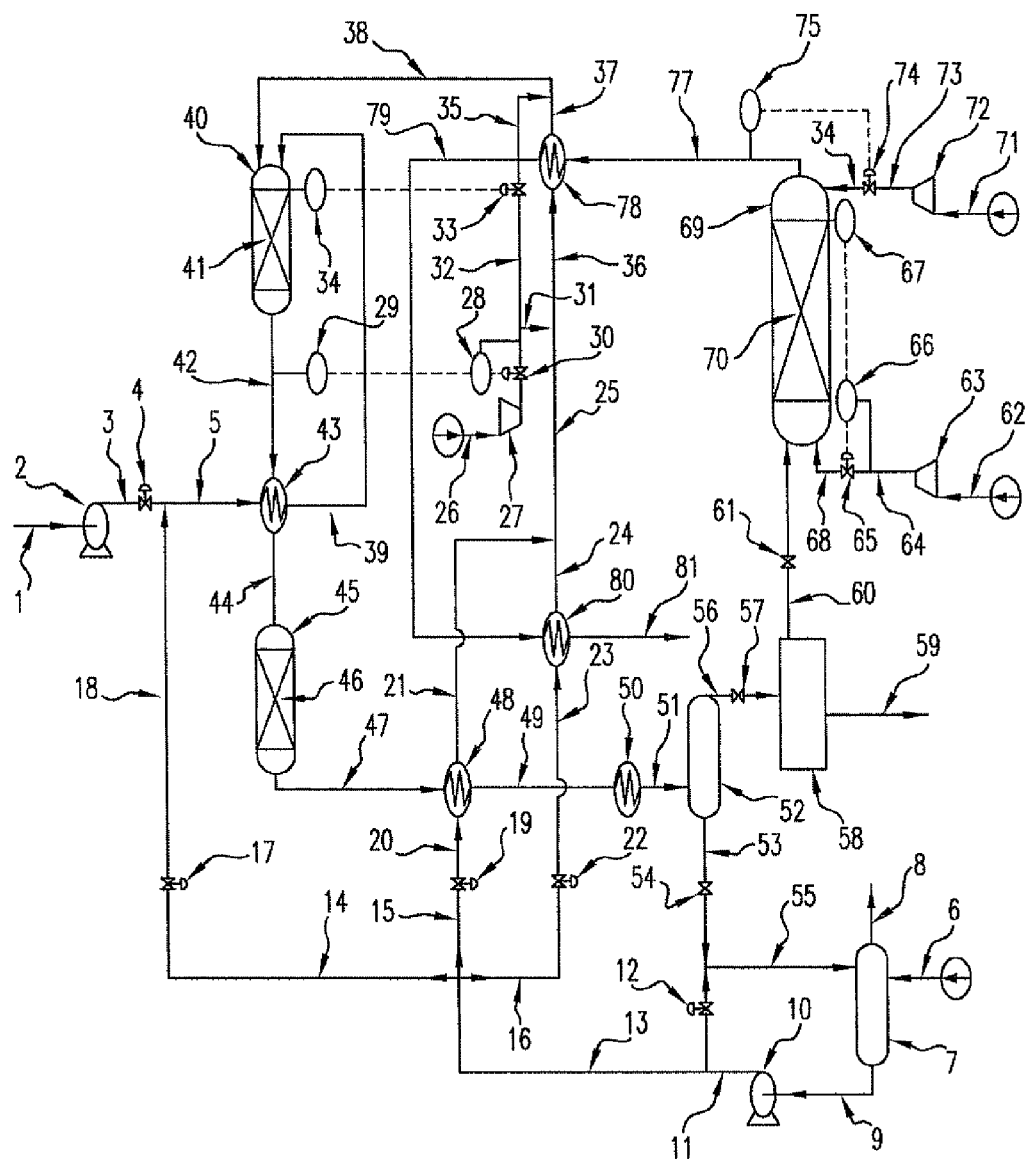

PROCESS FOR THE PRODUCTION OF HIGHLY THERMALLY-INTEGRATED HYDROGEN BY REFORMING A HYDROCARBON FEEDSTOCK

FIELD OF THE INVENTION

The invention relates to the field of the production of hydrogen by reforming a hydrocarbon feedstock.

The hydrogen is used as a raw material in numerous chemical applications. It is an alternative fuel, which makes it possible to supply, for example, fuel cells. The latter have become an absolute necessity in this field because they provide a response to the production of non-polluting energy.

Various processes are used for the production of hydrogen from a hydrocarbon fuel:

Partial oxidation (POX for partial oxidation according to the English terminology) is a very often catalyzed exothermic reaction that produces hydrogen ($H_2$) by reaction between the feedstock and the oxygen ($O_2$) that are contained in, for example, air:

In the case of methane, for example: $CH_4 + \frac{1}{2} O_2 \rightarrow CO + 2 H_2$ This reaction is to differentiate the following from the total oxidation (TOX for total oxidation) that does not produce hydrogen:

In the case of methane, for example: $CH_4 + 2 O_2 \rightarrow CO_2 + 2 H_2O$

Vapor Reforming (SMR for steam reforming according to the English terminology) is also a catalytic endothermic reaction that produces hydrogen by reaction of the feedstock with water ($H_2O$):

In the case of methane, for example: $CH_4 + H_2O \rightarrow CO + 3 H_2$

The autothermal reforming (ATR for autothermal reforming according to the English terminology) is the coupling of the partial oxidation reaction and vapor reforming.

Whereby the exothermicity of the partial oxidation compensates for the endothermicity of the vapor reforming, an autothermal reformer can be adiabatic, apart from the heat losses. This operating mode is therefore important for the management of energy.

The vapor reforming or the autothermal reforming are preferred within the scope of the invention because they lead to a synthesis gas (mixture of carbon monoxide (CO), carbon dioxide ($CO_2$) and hydrogen ($H_2$)) that is richer in hydrogen than partial oxidation.

At the outlet of a reforming unit, the hydrogen-rich effluent gas contains many impurities, in particular carbon monoxide (CO). The latter is particularly troublesome because it poisons the catalyst of the fuel cells. It is for this purpose that a unit for separation and purification is generally installed to extract the pure hydrogen.

It is known that the level of carbon monoxide can be reduced by reacting carbon monoxide with water (WGS for water gas shift reaction according to the English terminology) producing carbon dioxide and hydrogen.

$CO + H_2O \rightarrow CO_2 + H_2$ (WGS)

In this reaction, the water vapor that is used may be that which is present in excess in the effluent or else the water vapor that is added to the reformate. It requires the use of a suitable catalyst.

At the outlet of a reactor for reacting carbon monoxide and water, the molar percentage of carbon monoxide (CO) is about 0.5 or higher. The effluent also contains water and carbon dioxide ($CO_2$). According to the degree of purity that the user wishes to obtain, it is suitable to use an additional purification means.

One possibility is to use a system for purification by adsorption (PSA for pressure swing adsorption according to the English terminology). This technology makes it possible to obtain hydrogen of very high purity (higher than 99.9% by volume) from a reformate after conversion of the carbon monoxide. The PSA is based on the adsorption principle of the impurities in molecular sieve beds. The regeneration is obtained by expansion of the adsorption bed and flushing by an internal purge gas. The continuity of the system is ensured by the concurrent installation of several tanks.

Another possibility consists in a reaction of preferred oxidation (PrOx for preferential oxidation according to the English terminology).

$CO + \frac{1}{2} O_2 \rightarrow CO_2$ (PrOx)

This reaction is conducted in a reactor that contains a suitable catalyst at a temperature that promotes the oxidation of the carbon monoxide with the oxygen of the air in the presence of hydrogen but without consuming or oxidizing substantial amounts of hydrogen or leading to the inverse reaction of the conversion of carbon monoxide into water (RWGS for Reverse Water Gas Shift in English terminology).

A membrane purification is also a system that is used frequently.

The large-scale hydrogen production processes are used primarily in industries that require pure hydrogen for certain chemical operations, or in the provisioning of stationary fuel cells. The advantage of these large installations is the possibility of maximizing the hydrogen yield by integrating very strongly and in a complex way all of the units of the installation. It is also possible to use expensive construction materials that are resistant to very high temperatures. The small-scale processes for the production of pure hydrogen are a response to the problem of transport and storage of hydrogen. Small units, less costly and more mobile, make it possible to have a hydrogen source that is close to the installation that requires it.

A fuel in liquid form, such as, for example, ethanol, is easier to manipulate for a user than a gaseous feedstock. However, the use of a liquid feedstock poses the additional problem of the evaporation of this feedstock. Actually, before entering the autothermal reformer, the feedstock is to be in vapor form and mixed with water vapor and air. The process is therefore, on the one hand, to evaporate the liquid feedstock, and, on the other hand, to produce the water vapor that is necessary to the reaction. It is difficult under these conditions to design a totally autothermal process without thereby reducing the yield of pure hydrogen of the installation.

PRIOR ART

Systems for producing hydrogen have already been well developed for many years now, and the corresponding means are well known to one skilled in the art. The requirements for small-scale inexpensive installations, however, make it necessary to work toward improving these reforming systems.

The hydrogen production system described in the Patent Application WO 2002/088022, for example, is characterized by the absence of a reactor whose purpose is to ensure that the water is evaporated. In this process, the evaporation is done by indirect heat exchange with a burner.

In the U.S. Patent Application US 2002/0071790, the thermal integration of the hydrogen production process passes through a specific device: an integrated reactor. Inside of the latter, a residual gas burner of the process makes it possible to generate the heat that is necessary to the other operational units.

The Patent Application WO 2005/118126 describes a process for producing pure hydrogen by reforming a hydrocarbon feedstock. This process attempts to meet the need for inexpensive, small units. To do this, the thermal integration of the process is promoted, as is the judicious use of the heat of the hot effluent from the reformer to evaporate the water that is required for the reforming reaction.

SUMMARY DESCRIPTION OF THE INVENTION

The invention relates to a process for the production of hydrogen that is integrated thermally by reforming a hydrocarbon feedstock that comprises:

A stage a wherein a stream, whose temperature is less by at least 200° C. than the combustion temperature inside a burner, is selected from among a stream of air and a stream of water and is mixed with the effluent that is obtained from said burner, making it possible to reduce the temperature of the effluent that is obtained from said burner to less than 725° C.;

A stage b, wherein the mixture that is obtained from stage a enters a first heat exchanger, is used to superheat at least one water vapor stream and/or hydrocarbon feedstock stream in gaseous form, whereby said stream that is thus superheated by indirect heat exchange is injected directly into a reforming reactor where it is used as a fuel, and said mixture exits from the exchanger;

A stage c wherein the mixture that is obtained from stage b enters a second heat exchanger and is used to evaporate totally a stream of liquid water and/or hydrocarbon feedstock when the latter is liquid.

Very preferably, during stage a, it is an air stream at ambient temperature that is mixed with the effluent from the burner.

SUMMARY DESCRIPTION OF THE FIGURES

The figure is a process diagram that shows an installation variant for producing hydrogen by reforming a hydrocarbon feedstock according to the invention.

DETAILED DESCRIPTION OF THE INVENTION

The invention is suitable for the reforming of hydrocarbon feedstocks. The hydrocarbon feedstock is preferably liquid. It may involve hydrocarbons, petroleum fractions or alcohols, preferably ethanol, or finally mixtures of the latter. A potentially advantageous fuel is bioethanol. This biofuel is presented as a long-lasting energy alternative. It is obtained by fermentation or distillation of vegetable raw materials, such as, for example, saccharose or starch. It has the advantage of having a very low level of greenhouse gas emissions.

Certain feedstocks can contain sulfur-containing compounds or odorous compounds that are added intentionally for safety reasons or legal reasons. The latter can deteriorate the catalysts that are present in the installation. It is therefore customary for one skilled in the art to purify the feedstock before its use by using, for example, one desulfurization unit.

In addition to the hydrocarbon feedstock, the process requires an input of water. The latter is preferably deionized. When the reforming reaction is an autothermal reforming, an oxygen source is necessary to the reaction. The latter can be pure oxygen, air or oxygen-enriched air.

The reforming process that is implemented in the invention is selected from among the processes that are known to one skilled in the art. The invention preferably uses an autothermal reforming reactor (ATR according to the English terminology). The latter typically operates at a temperature of between 400° C. and 1000° C. and is preferably less than 725° C., which is the boundary temperature that can support an inexpensive material. One skilled in the art, however, generally seeks to reach a maximum temperature because the vapor-reforming reaction (or vapor reforming) of the hydrocarbon feedstock with the water, a reaction that promotes a high hydrogen fraction in the synthesis gas that is formed, is endothermic. The pressure is traditionally between 100 and 4000 kPa. The authothermal reforming reactor contains one or more catalysts that are suitably selected by one skilled in the art. For example, autothermal reforming catalysts are marketed by the SüdChemie Company (FCR-14 monolith) or the Engelhard Company (SELECTRA ATR catalyst: non pyrophoric shift catalyst).

The feedstocks that are introduced into the reforming reactor are first preferably heated to a temperature of between 300° C. and 500° C., preferably between 425° C. and 475° C. When the hydrocarbon feedstock is liquid, the latter can be evaporated by itself or with water and/or with air and/or with water vapor before being injected into the reforming reactor in gaseous form. It is generally important not to have a two-phase mixture at the inlet of the reformer because this reduces the performance levels of the reactor. The water is also evaporated by itself or with the air and/or with the hydrocarbon feedstock. At the inlet of the reformer, in general it is important that the temperature of the mixture remains less than the self-ignition temperature of the feedstock under the operating conditions. For example, in the case of a hydrocarbon feedstock that consists of ethanol, the temperature at the inlet of the reforming reactor is preferably less than 475° C.

The energy that is necessary for this evaporation and heating is taken at different points in the process by heat exchangers that are well-positioned and appropriately sized by one skilled in the art. The primary heat sources are the hot effluent that exits from the reformer and the combustion gases that are obtained from the residual gas burner. For safety reasons, it is generally preferred not to heat the oxygen source, for example air, by heat exchange with the effluent from the reforming reactor or the reactor for converting carbon monoxide into water because these gaseous streams are rich in hydrogen. Preferably, to maximize the production of water vapor, the liquid hydrocarbon feedstock is evaporated with as large an amount of water as possible by using the heat of the effluent from the reformer. Certain other effluents, such as that of the reactor for converting carbon monoxide into water (WGS according to the English terminology), if it is present, can be employed. Overall, good heat integration makes it possible to reach a quite high $H_2O/C$ molar ratio (preferably more than 3.0, and more preferably more than 4.0), which makes it possible to achieve a good hydrogen yield (preferably more than 60%, and more preferably more than 64%), while maintaining the autothermal process, i.e., without input of outside energy.

The reformate, i.e., the effluent from the reforming reactor, is a synthesis gas. It is preferably treated by a purification section. Said section can contain one or more units that make it possible to reduce the carbon monoxide level, to separate the hydrogen-rich gas, and to purify it.

Typically, a reactor for converting carbon monoxide into water is the most used means. Several catalytic conversion zones can be used to reduce the level of carbon monoxide in the reformate. It is common, for example, for one skilled in the art to use two separate catalytic zones, one at high temperature (300 to 560° C.) upstream (high temperature conversion or HT shift according to the English terminology), and one at low temperature (from 200 to 260° C.) downstream (low temperature conversion or LT-shift according to the English terminology). The suitable catalysts are selected by one skilled in the art. For example, commercial catalysts are proposed by the following companies: Südchemie (PMS5B), BASF (K8-1 shift catalyst), Engelhard (non-pryophonic SELECTRA shift catalyst), PM-5 WGS catalyst), Johnson Matthey (KATALCO (high temperture shift) 71-5 catalyst). At the outlet of a reactor for converting carbon monoxide into water, the percentage by volume of carbon monoxide (CO) is generally about 0.5 or more. The effluent also contains water and carbon dioxide ($CO_2$). Whereby the reaction is exothermic, the heat of the effluent from the reactor for converting carbon monoxide into water is generally employed for heating other streams of the process.

The effluent from the reactor for converting carbon monoxide into water is preferably cooled by one or more exchangers, and then the remaining water can be eliminated, preferably in a condenser. To limit the water content in the hydrogen-rich gas beyond the purification unit, the temperature of the mixture is preferably lowered below 40° C. The water of the process that is recovered after condensation can preferably be recycled: after passage into a water purification system, it can be returned to the beginning of the process where it can be used, for example, as a reagent in the vapor-reforming reaction. An addition of make-up water is necessary, however, since the overall consumption of the water of the process is about 17 kg/hour for a production of about 50 $Nm^3$/hour ($Nm^3$ means "normal meter cubed" and represents a cubic meter under normal conditions of pressure and temperature) of pure hydrogen.

It is possible to use any other form of additional purification, such as, for example, a preferred oxidation (PrOx). In a preferred embodiment of this process, the purification section comprises a system for purification by adsorption (PSA for pressure swing adsorption according to the English terminology). This technology makes it possible to obtain hydrogen of very high purity (more than 99.9% by volume) from a hydrogen-rich gas. The PSA is based on the adsorption principle of the impurities on molecular sieve beds. The regeneration is obtained by expansion of the adsorption bed and flushing by an internal purge gas. The continuity of the system is ensured by the concurrent installation of several tanks. The unsuitable gases that are discharged by this purification section, referred to as "off-gas" according to the English terminology, consist of, for example during an autothermal reforming, a portion of the hydrogen that is produced (about 15 mol %), unconsumed hydrocarbon feedstock in the reaction (about 2 mol %), nitrogen (about 47 mol %), carbon dioxide (about 33 mol %), carbon monoxide (about 2 mol %) and water (about 1 mol %). These gases are preferably burned in a gas burner.

This gas catalytic burner (referred to as "off-gas burner" according to the English terminology) is supplied with air (called primary combustion air or primary air) by a ventilation system. If the hydrogen production installation is coupled to a fuel cell, the exiting anodic and cathodic gases are also preferably used as residual gases and are burned in the residual gas burner.

The hot effluents from the burner (flue gas), referred to as "flue gas" according to the English terminology, are used below to heat and/or to evaporate indirectly the hydrocarbon feedstock and/or the water and/or the air via heat exchangers.

Thus, two heat exchangers are installed consecutively on the hot stream of the effluents from the burner:

The first exchanger, the closest to the burner and therefore brought into contact with the very hot effluents from the burner, is used to superheat a mixture of water vapor, preferably with air and/or the hydrocarbon feedstock in gaseous form. This mixture that is thus superheated by indirect heat exchange is injected directly into the reforming reactor, where it is used as a fuel.

The second exchanger, located downstream from the first exchanger by taking into consideration the hot stream of the effluents from the burner and therefore brought into contact with these same effluents that are cooled by the first exchanger, is used as an evaporator. It makes it possible to evaporate a liquid water stream and/or a hydrocarbon feedstock when the latter is liquid. It generates a water vapor stream and/or evaporated hydrocarbon feedstock.

According to a preferred version of the process, a stream of liquid water and/or a liquid hydrocarbon feedstock is evaporated by the second heat exchanger, is mixed with an oxygen source, preferably a stream of air, and this mixture is superheated in the first heat exchanger. The circulation of the streams, however, can be carried out by any different methods that one skilled in the art deems possible. For example, the evaporated stream that is obtained from the second heat exchanger can be mixed with other streams before this new mixture enters the first exchanger. It is generally preferred to have one-phase streams at the inlet and the outlet of all the heat exchangers.

The temperature constraints on the two burners are important for the good operation of the process. The temperature of all the streams preferably does not exceed 725° C., which is the maximum temperature that a low-cost material can support. In addition, the distribution of the heat between the two burners is essential, primarily for two reasons:

To prevent the mixture that exits from the first heat exchanger and comes in at the inlet of the reforming reactor from having a temperature beyond its self-ignition temperature.

So that the water stream that exits from the second heat exchanger is totally evaporated. Actually, if the evaporation is not complete at the outlet of the second exchanger, it is a two-phase mixture that is then injected into the first exchanger, which reduces the effectiveness of the heat exchange inside this first exchanger because the distribution of the two phases in the exchanger is generally not homogeneous.

A means for monitoring the distribution of the heat in the two exchangers consists in diluting the hot effluent gas of the burner by a cold stream that can be, for example, fresh air or water. In the text below, the terms cold or fresh stream refer to a stream whose temperature is less by at least 200° C. than the combustion temperature inside a burner. Preferably, this fresh stream has a temperature of between –10° C. and 400° C. Very preferably, this fresh stream is at ambient temperature. Even more preferably, this fresh stream is an air stream. It is mixed with the hot gas of the outlet of the burner between the outlet of the catalytic zone of the burner and the first exchanger. The mixture can therefore be carried out outside of the burner or inside the burner after the catalytic zone. The flow rate of this added stream is monitored. Thanks to this addition of a fresh stream to the hot effluent from the burner, it is possible to reduce the temperature of this hot effluent before its input into the first exchanger and thus to reduce the fluctuation of temperature between the hot source and the cold source of the exchanger. In this way, the heating capacity yielded by the hot mixture obtained from the burner in the first exchanger is reduced. However, the flow rate of the hot mixture that is obtained from the burner being higher, the temperature of the superheated evaporated stream that exits from the first exchanger remains unchanged. The temperature of the hot mixture after passage into the first exchanger is high enough to allow the total evaporation of the water and/or the hydrocarbon feedstock when it is liquid, which is introduced into the second exchanger.

Preferably, the mixture of residual gases of the section for purifying hydrogen and primary combustion air is burned in the catalytic burner at about 900° C. The fresh stream, preferably of air, injected into the effluent gas of the burner, makes it possible to reduce the temperature of said effluent gas to a temperature of less than 725° C., preferably between 600° C. and 725° C., and more preferably between 600° C. and 700° C.

A system for monitoring the temperature of the effluent gases of the burner before the addition of the fresh stream and after said addition makes it possible to regulate the temperature of the hot effluent from the burner. The first system for monitoring the temperature before the addition of the fresh stream is connected to the system for distributing the primary combustion air. It makes it possible to obtain an effective combustion and a combustion temperature of generally about 900° C. The second system for monitoring the temperature after the addition of the fresh stream is connected to the distribution system of the fresh stream, preferably air. It makes it possible to regulate the temperature of the effluent gas of the hot burner before the first heat exchanger.

In a preferred variant of the process, a water stream is evaporated in the second heat exchanger and then superheated in the first exchanger. Still according to this variant, the supply of air of the reforming reactor, when the reforming is autothermal, is carried out by adding the air stream to said water stream at two points: one between the second exchanger and the first exchanger, and the other between the first exchanger and the reforming reactor. The supply of air is controlled preferably by a compressor/valve system that is connected to a temperature sensor that is located on the stream that is obtained from the reforming reactor. Actually, the addition of an oxygen source into the reforming reactor promotes the partial and total oxidation reactions of the hydrocarbon feedstock, which are exothermic. For its part, the distribution of this cold air between the first and the second point of entry on the water stream is controlled preferably by a valve that is connected to a temperature sensor that is located at the inlet of the reforming reactor. In this way, the temperature at the inlet of the autothermal reformer preferably does not exceed the self-ignition temperature of the fuel.

Preferred Variant Embodiment of the Invention

The figure is a process diagram that shows a preferred variant of the hydrogen production process according to the invention.

This process comprises an autothermal reformer 40, a catalytic burner 69, and a section for purifying the hydrogen-rich gas that is produced and that itself comprises a reactor for converting carbon monoxide into water 45, a condenser 52, a system for purification by adsorption (PSA) 58, and a water purification system 7. The thermal integration is ensured by four heat exchangers 43, 48, 78 and 80, as well as a water cooler 50. Two pumps 2 and 10 are used to supply the installation with hydrocarbon feedstock, on the one hand, and water, on the other hand. Three compressors 27, 63 and 72 are used for the supply of air.

The hydrocarbon feedstock is brought into the installation via the line 1, the pump 2 and the line 3. The valve 4 is used to regulate the inlet flow rate of the hydrocarbon feedstock. This stream is mixed with a stream of liquid water coming in via the line 18.

The cold water enters the installation via the line 6. It enters the water purification system 7 and exits via the line 9, the pump 10, and the line 11. A portion of this water stream, of which the flow rate is regulated by the valve 18, is sent into the water purification system 7 via the line 55. The other portion is bound for the reforming process itself and passes via the line 13. To optimize the thermal effectiveness of the process, the stream that comes in via the line 13 is divided into three streams: the flow rate of the line 14 is regulated via the valve 17, the flow rate of the line 15 is regulated via the valve 19, and the flow rate of the line 16 is regulated via the valve 22. The liquid water stream that is controlled by the valve 17 is mixed with the liquid hydrocarbon feedstock stream via the line 18. The mixture of liquid water/liquid hydrocarbon feedstock that is thus formed passes via the line 5 into the heat exchanger 43, where it is brought into contact with the hot stream that is obtained from the reformer 40 and that passes from the line 42 to the line 44. The stream that exits from this exchanger via the line 39 is totally evaporated. It enters the autothermal reforming reactor 40. The liquid water stream that is controlled via the valve 19 enters the heat exchanger 48 via the line 20. It is totally evaporated via indirect heat exchange with the effluent from the reactor for converting carbon monoxide into water 45 that enters hot in the exchanger 48 via the line 47 and by exiting via the line 49. The evaporated water stream exits from the exchanger via the line 21. The water stream that is controlled via the valve 22 enters the heat exchanger 80 via the line 23. It is totally evaporated by indirect heat exchange with the hot stream that enters the exchanger 80 via the line 79 and exits therefrom via the line 81. The evaporated water stream exits from the exchanger via the line 24. The two evaporated water streams in the lines 21 and 24 are mixed and pass into the line 25. The addition of an air stream via the line 31 makes it possible to generate a gaseous stream of air and water vapor in the line 36, which is superheated in the heat exchanger 78 by contact with the hot stream that comes in via the line 77 and exits via the line 79. The mixture of air and superheated water vapor exits from the heat exchanger 78 via the line 37, is mixed with a cold air stream that comes in via the line 35, and enters the reforming reactor 40 via the line 38.

The air that is used in the reforming reaction enters the process via the line 26 and the compressor 27. Its flow rate is regulated by the valve 30 and the flow rate regulator/indicator 28. The latter is coupled to the temperature regulator/indicator 29 that measures the temperature of the stream of the line 42 that exits from the reforming reactor. A portion of the air comes in via the line 31 and is mixed with the stream of water vapor that comes in via line 25. The other portion comes in via the line 32, the valve 33 and the line 35, and it is mixed with the streams of water vapor and superheated air that come in via line 37. The valve 33 is controlled via the temperature regulator/indicator 34 that measures the temperature at the inlet of the autothermal reforming reactor 40.

The autothermal reforming reactor 40 is supplied with hydrocarbon feedstock and water vapor via the line 39 and with water vapor and air via the line 38. At the inlet of the reactor, the temperature regulator/indicator 34, connected to the valve 33, makes it possible to monitor that the temperature of the mixture is less than its self-ignition temperature. The mixture is brought into contact with the catalytic bed 41. The gaseous effluent that exits from the reformer via the line 42 is a hot hydrogen-rich gas. Its temperature is controlled by the temperature regulator/indicator 29, connected to the flow rate regulator/indicator 28 and the valve 30. The hydrogen-rich gas of the line 42 is cooled in the exchanger 43 by thermal contact with the cold stream that enters line 5 and exits line 39. The thus cooled stream passes via the line 44 into the reactor for converting carbon monoxide into water 45 where it is brought into contact with the catalyst 46. The hot effluent from the line 47 is cooled in the heat exchanger 48 via thermal contact with the liquid water stream that passes into the exchanger of the line 20 to the line 21. The hydrogen-rich gas exits via the line 49 and is again cooled in the cooler 50. At the outlet, the stream passes via the line 51 into the condenser 52, where the remaining, unconsumed water in the process is removed. The latter is evacuated via the line 53 that is controlled via the valve 54 and rejoins the water purification system 7 via the line 55. After the passage into the condenser 52, the dry hydrogen-rich gas is conveyed into the system for purification by adsorption 58 via the line 56 that is controlled via the valve 57. This purification system 58 makes it possible to generate a pure hydrogen gas, which is drawn off via the line 59. A residual gaseous stream also exits via the line 60, controlled via the valve 61.

This residual gaseous stream 60 is injected into the residual gas burner 69 that contains a catalyst 70. The burner is also supplied with air, used for the combustion. This air enters the installation via the line 62 and the compressor 63, then the lines 64 and 68, separated by a valve 65. This valve is controlled by a flow rate regulator/indicator 66, itself controlled by a temperature regulator/indicator 67 that measures the temperature at the outlet of the catalytic combustion zone of the burner. A second intake of air is at the outlet of the catalytic zone 70 of the burner 69. A fresh air stream enters the installation via the line 71, the compressor 72 and the line 73. A valve 74, connected to a temperature regulator/indicator 75 that is installed on the line 77 at the outlet of the burner, makes it possible to regulate the temperature of the hot effluent that exits from the burner via the line 77.

This hot effluent passes into the heat exchanger 78 where it superheats the gaseous stream that enters via the line 36 and exits via the line 37. The effluent from the cooled burner exits from the exchanger 78 via the line 79, then enters into a second exchanger, the heat exchanger 80, where it allows the evaporation of the water stream that enters via the line 23 and exits via the line 24. Finally, the gases that exit from the exchanger 80 are discharged in the form of flue gas (flue gas according to the English terminology) via the line 81.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A thermally integrated process for the production of hydrogen by reforming water and a hydrocarbon feedstock to produce a synthesis gas, comprising:
    (a) mixing a stream of air and/or water, said stream having a temperature less by at least 200° C. than combustion temperature inside a burner, with effluent that is obtained from said burner, reducing the temperature of the effluent that is obtained from said burner to less than 725° C.,
    (b) using the mixture of effluent and air and/or water that is obtained from (a) in a first heat exchanger, superheating at least one of a water vapor stream and a hydrocarbon feedstock stream in gaseous form, injecting said stream that is thus superheated by indirect heat exchange directly into a reforming reactor where it is used as a fuel, and said mixture of effluent and air and/or water from (a) exits from the first heat exchanger,
    (c) employing the mixture exiting said first heat exchanger in (b) in a second heat exchanger to totally evaporate a stream of liquid water and/or hydrocarbon feedstock when the latter is liquid.

2. The process according to claim 1, comprising mixing a stream of air or water, whose temperature is between −10° C. and 400° C., at an outlet of the burner with the effluent that is obtained from the burner in (a).

3. The process according to claim 2, wherein a stream of air at ambient temperature is mixed at the outlet of the burner with the effluent that is obtained from the burner in (a).

4. The process according to claim 1, wherein effluent from the burner is obtained from (a) and is between 600° C. and 700° C.

5. The process according to claim 1, wherein a stream of evaporated air is employed in the second heat exchanger in (c) and is subsequently superheated in the first heat exchanger in (b).

6. The process according to claim 5, wherein an air stream is mixed with the water stream between evaporation of the water stream in the second heat exchanger and its superheating in the first heat exchanger.

7. The process according to claim 1, wherein the hydrocarbon feedstock in (c) is in liquid form.

8. The process according to claim 1, wherein the hydrocarbon feedstock in (c) is ethanol.

9. The process according to claim 1, wherein the reforming reaction is autothermal reforming.

10. The process according to claim 1, further comprising treating the reformate that is produced in the process to further purify the hydrogen gas produced.

11. The process according to claim 10, wherein water that is contained in hydrogen gas obtained from the reforming reactor is eliminated using a condenser.

12. The process according to claim 11, wherein water that is collected in the condenser is recycled in the process.

13. The process according to claim 12, wherein water that is collected in the condenser is recycled to the reforming reactor and used as a reagent of the reforming reaction.

14. The process according to claim 10, wherein a reactor converting carbon monoxide into water and a system for purification by adsorption treat successively reformate that is obtained from the reforming reactor after purification.

15. The process according to claim 10, wherein residual gases after purification are used as a fuel in the burner in (a).

* * * * *